(12) United States Patent
Wallen et al.

(10) Patent No.: US 8,758,003 B2
(45) Date of Patent: Jun. 24, 2014

(54) MULTIPLE SPIDER HEAD

(75) Inventors: John Michael Wallen, Lindsborg, KS (US); James W. Nixon, McPherson, KS (US); Bradley M. Eisenbarth, McPherson, KS (US)

(73) Assignee: American Maplan Corporation, McPherson, KS (US)

( * ) Notice: Subject to any disclaimer, the term of this patent is extended or adjusted under 35 U.S.C. 154(b) by 433 days.

(21) Appl. No.: 12/886,945

(22) Filed: Sep. 21, 2010

(65) Prior Publication Data
US 2011/0095449 A1    Apr. 28, 2011

Related U.S. Application Data

(60) Provisional application No. 61/244,560, filed on Sep. 22, 2009.

(51) Int. Cl.
  *B29C 47/20* (2006.01)
(52) U.S. Cl.
  USPC .................... 425/192 R; 425/376.1; 425/380
(58) Field of Classification Search
  USPC ................................... 425/192 R, 376.1, 380
  See application file for complete search history.

(56) References Cited

U.S. PATENT DOCUMENTS

| 2,913,763 | A |   | 11/1959 | Longstreth et al. |
|---|---|---|---|---|
| 3,583,033 | A |   | 6/1971 | Christofas et al. |
| 3,834,209 | A |   | 9/1974 | Robertson |
| 4,000,932 | A |   | 1/1977 | Harris et al. |
| 4,249,875 | A | * | 2/1981 | Hart et al. ................. 425/133.1 |
| 4,711,623 | A |   | 12/1987 | Gross et al. |
| 5,045,254 | A | * | 9/1991 | Peelman et al. ................ 264/48 |
| 5,474,722 | A |   | 12/1995 | Woodhams |
| 6,164,905 | A |   | 12/2000 | Pabois |
| 2002/0109259 | A1 |   | 8/2002 | Groeblacher et al. |
| 2003/0222375 | A1 | * | 12/2003 | Dohmann et al. ....... 264/211.21 |
| 2005/0206031 | A1 |   | 9/2005 | Groeblacher et al. |

FOREIGN PATENT DOCUMENTS

JP    2000-108193 (A)    4/2000

* cited by examiner

*Primary Examiner* — James Sanders
(74) *Attorney, Agent, or Firm* — Hamilton, Brook, Smith & Reynolds, P.C.

(57) ABSTRACT

The extrusion head including a conduit with a central mandrel extending within the conduit for supporting an inner die portion of a set of dies that has inner and outer die portions. An upstream spider and a downstream spider are included, and each have webs supporting the central mandrel at axially spaced apart positions. The webs of the upstream and downstream spiders can have web portions that are axially offset from each other to promote mixing of polymer flowing through the conduit.

10 Claims, 14 Drawing Sheets

MULTIPLE SPIDER HEAD

RELATED APPLICATION

This application claims the benefit of U.S. Provisional Application No. 61/244,560, filed on Sep. 22, 2009. The entire teachings of the above application is incorporated herein by reference.

BACKGROUND

A plastic extrusion apparatus can be used for producing an extruded plastic product, such as pipe. Such an extrusion apparatus can have an extrusion head, to which a set of extrusion dies having inner and outer die portions are secured. Molten polymer is extruded through the dies and shaped into the desired product. The inner die portion is typically secured to an elongate central mandrel which is mounted at its upstream end to a spider, whereby the mandrel and inner die portion are supported in a cantilevered fashion. Such a cantilevered mounting can permit undesirable lateral deflection and movement of the mandrel and the inner die portion during use. This can result in movement of the inner die portion relative to the outer die portion and can effect the quality of the extruded product, such as an inconsistent wall thickness.

SUMMARY

The present invention can provide an extrusion head for an extrusion apparatus in which a central mandrel and inner die portion can be secured in such a manner that the inner die portion experiences little or no lateral movement to obtain an extruded product with a consistent wall thickness. The extrusion head can include a conduit with a central mandrel extending within the conduit for supporting an inner die portion of a set of dies that has inner and outer die portions. An upstream spider and a downstream spider are included, and each have webs supporting the central mandrel at axially spaced apart positions. The webs of the upstream and downstream spiders can have web portions that are axially offset from each other to promote mixing of polymer flowing through the conduit.

In particular embodiments, such mixing of the polymer flowing through the conduit can reduce or remove parting or spider lines in an extruded product that is extruded through the set of dies. The upstream spider can have thicker or more robust webs than the downstream spider, or conversely, the downstream spider can have thinner webs than the upstream spider. The upstream spider can have internal passages extending through the webs for electrical or control lines. The webs of the upstream and downstream spiders can be axially offset from each other. The downstream spider can be selected from a group of downstream spiders, where each has a different configuration, for changing and selecting the mixing characteristics, flow and/or the pressure of polymer entering the set of dies. The webs of the downstream spider can have a shorter length in the direction of polymer flow than the webs of the upstream spider. The conduit can have a larger diameter at the downstream spider than the upstream spider, which can further promote mixing of the polymer. The downstream spider can also have a larger diameter flow passage than the upstream spider.

The present invention can also provide an extrusion head including a conduit, and a central mandrel extending within the conduit for supporting an inner die portion of a set of dies that has inner and outer die portions. An upstream and downstream spider are included, and each have webs supporting the central mandrel at axially spaced apart positions. The webs of the upstream and downstream spiders can have web portions that are axially offset from each other to promote mixing of polymer flowing through the conduit for reducing spider lines in an extruded product that is extruded through the set of dies. The webs of the downstream spider can be thinner and shorter in length in the direction of polymer flow than the webs of the upstream spider.

The present invention can also provide a method of supporting a central mandrel extending within a conduit in an extrusion head. The central mandrel supports an inner die portion of a set of dies that has inner and outer die portions. The central mandrel can be supported at axially spaced apart positions with webs of an upstream spider and a downstream spider. The webs of the upstream and downstream spiders can have web portions that are axially offset from each other to promote mixing of polymer flowing through the conduit.

In particular embodiments, spider lines can be reduced in an extruded product that is extruded through the set of dies by the mixing of the polymer flowing through the conduit. The upstream spider can be provided with thicker webs than the downstream spider, or conversely, the downstream spider can be provided with thinner webs than the upstream spider. The upstream spider can be provided with internal passages extending through the webs for electrical lines. The webs of the upstream and downstream spiders can be axially offset from each other. The downstream spider can be selected from a group of downstream spiders, each having a different configuration, for changing flow and pressure of polymer entering the set of dies. The webs of the downstream spider can be provided with a shorter length in the direction of polymer flow than the webs of the upstream spider. The conduit can be provided with a larger diameter at the downstream spider than at the upstream spider which can further promote mixing of the polymer. The downstream spider can also have a larger diameter flow passage than the upstream spider.

The present invention can also provide a method of reducing spider lines in an extruded product that is extruded from polymer flowing through a conduit in an extrusion head out a set of dies that has inner and outer die portions. The inner die portion can be supported with a central mandrel extending within the conduit. The central mandrel can be supported at axially spaced apart locations with webs of an upstream spider and a downstream spider. The webs of the upstream and downstream spiders can have web portions that are axially offset from each other to promote mixing of the polymer flowing through the conduit for reducing spider lines in the extruded product.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
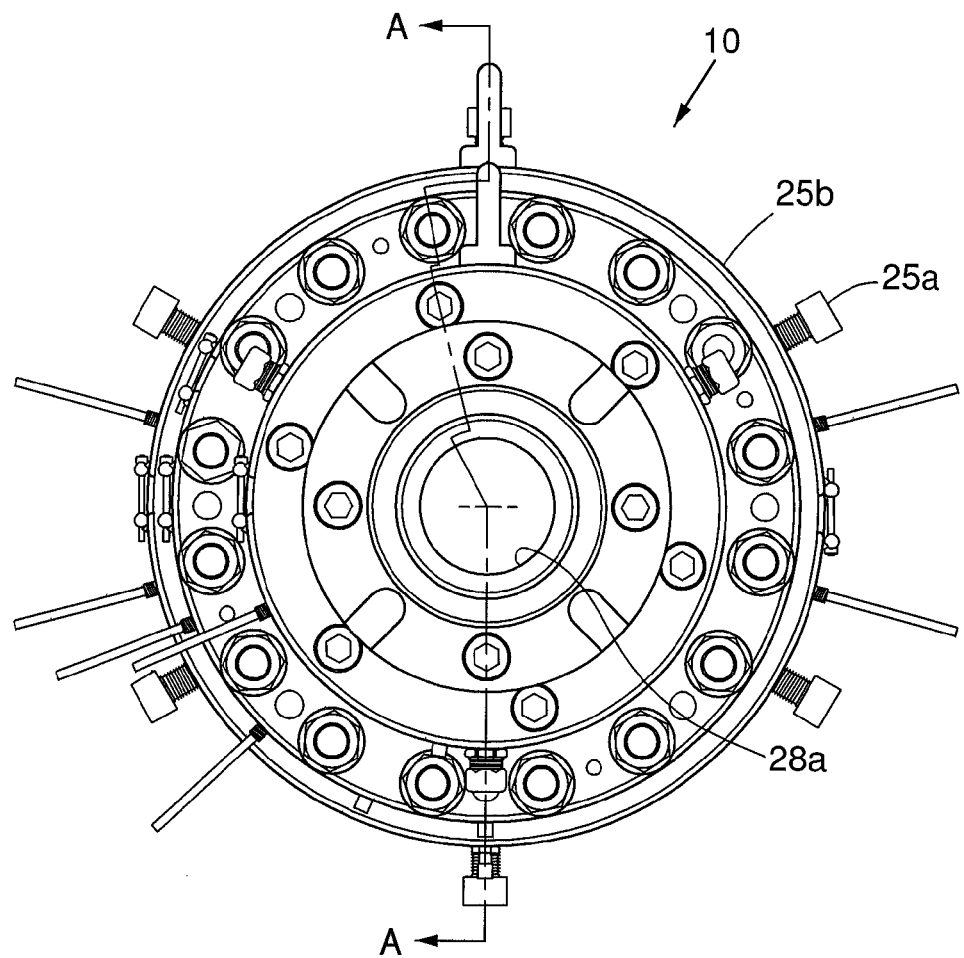
FIG. 1 is an upstream end view of an embodiment of an extrusion head in the present invention.
Figure 2:
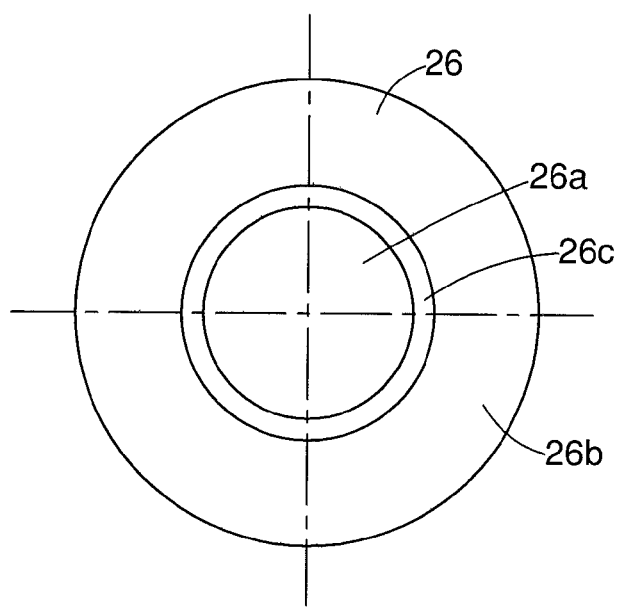
FIG. 2 is a downstream end view of an embodiment of an extrusion head showing the dies.
Figure 3:
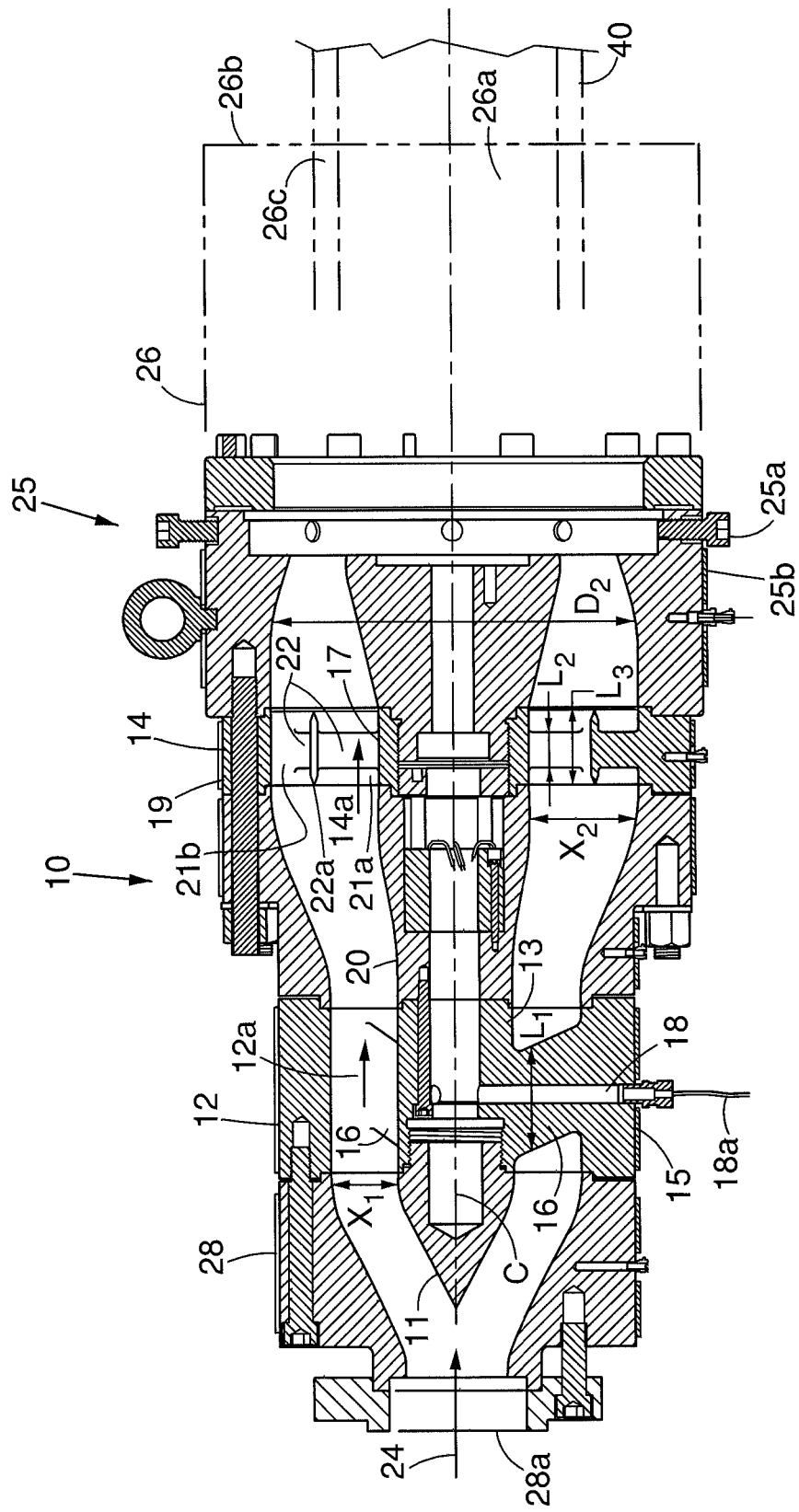
FIG. 3 is a side sectional view of the extrusion head of FIG. 1.
Figure 4:
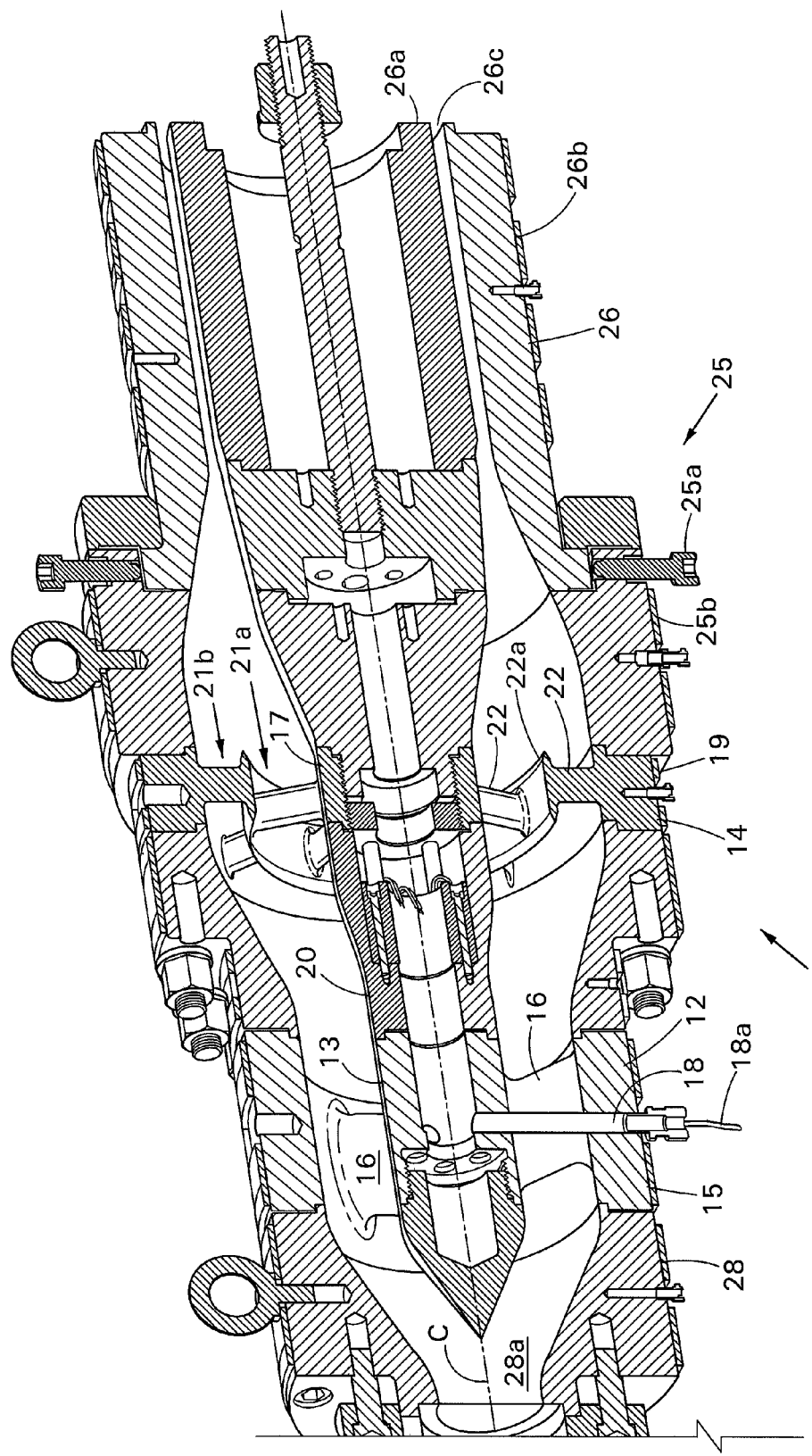
FIGS. 4 and 5 are perspective side sectional views of the extrusion head of FIG. 1.
Figure 5:
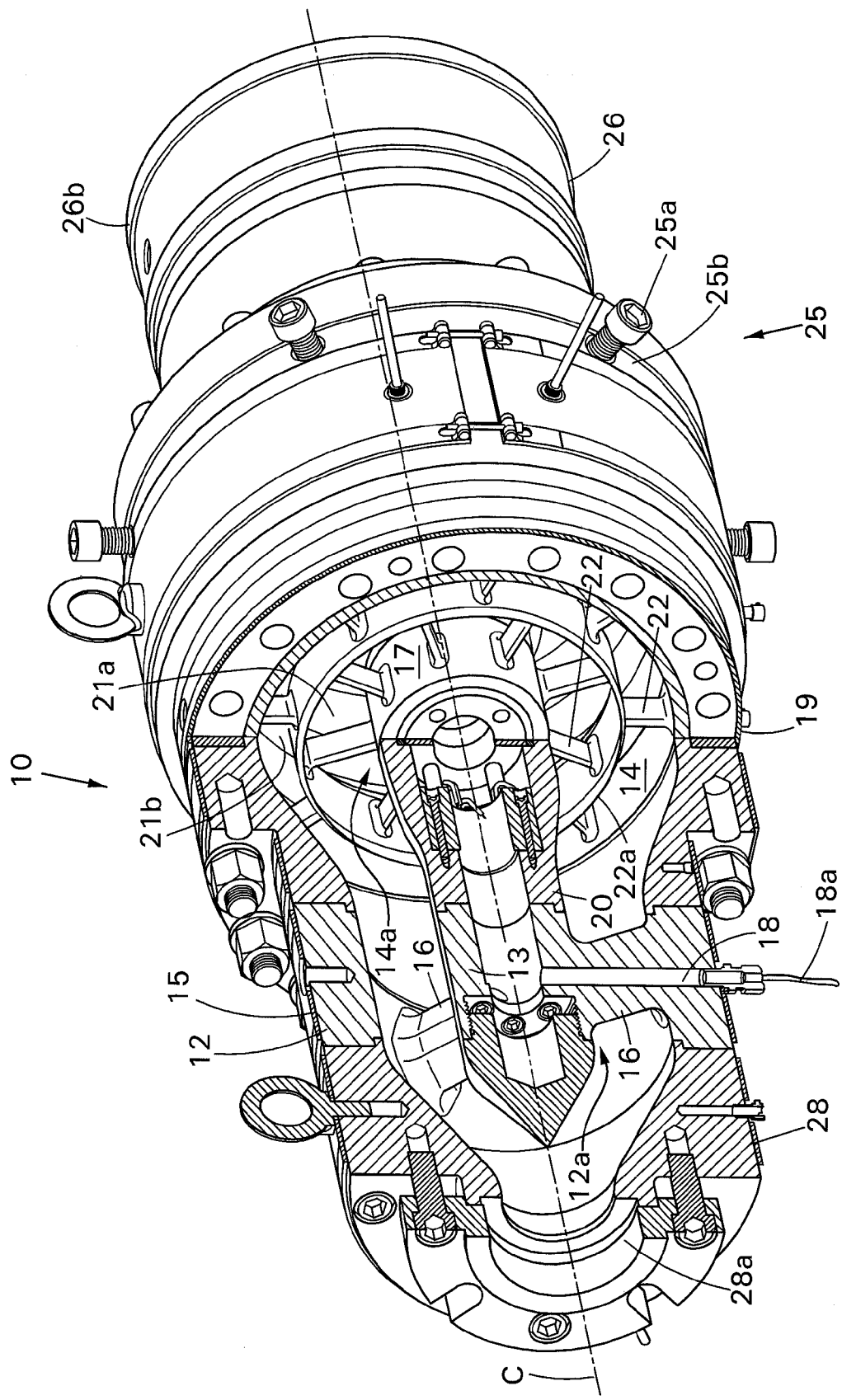

A description of example embodiments of the invention follows.

FIGS. 1-9 depict an embodiment of an extrusion head 10 on an extrusion apparatus in the present invention, which has a conduit 28 extending along a central longitudinal axis C with an entrance 28a for receiving molten polymer 24. The molten polymer 24 can be extruded through a set of dies 26 having inner 26a and outer 26b die portions, through the gap 26c therebetween, to form an extruded profile or product 40, such as a pipe. The gap 26c can be adjusted with an adjustment mechanism device or arrangement 25, which can include a series of adjusting screws 25a extending through an outer ring portion 25b to adjust the outer die portion 26b. The inner portion 26a of the dies 26 is supported by an elongate mandrel 20 positioned within the conduit 28 along axis C. The mandrel 20 can be centrally positioned and supported along axis C at two axially spaced apart positions or locations, by an upstream spider 12 and a downstream spider 14, which are positioned on axis C. The upstream spider 12 has a central hub 13 mounted to the mandrel 20 that is connected to a series of spaced radially extending support webs 16. The downstream spider 14 has a central hub 17 that is also mounted to the mandrel 20 and is connected to a series of spaced radially extending support webs 22. The spiders 12 and 14 have flow passages 12a and 14a around or past the hubs 13 and 17, and webs 16 and 22 to allow passage of the molten polymer 24. The conduit 28 in the region of the mandrel 20 and spiders 12 and 14 can expand and become generally annular in shape, in order to flow around the hubs 13 and 17, and the mandrel 20. A pointed flow tip 11 can be mounted to the upstream side of the central hub 13 of the upstream spider 12 to facilitate flow around the central hub 13.

Figure 6:
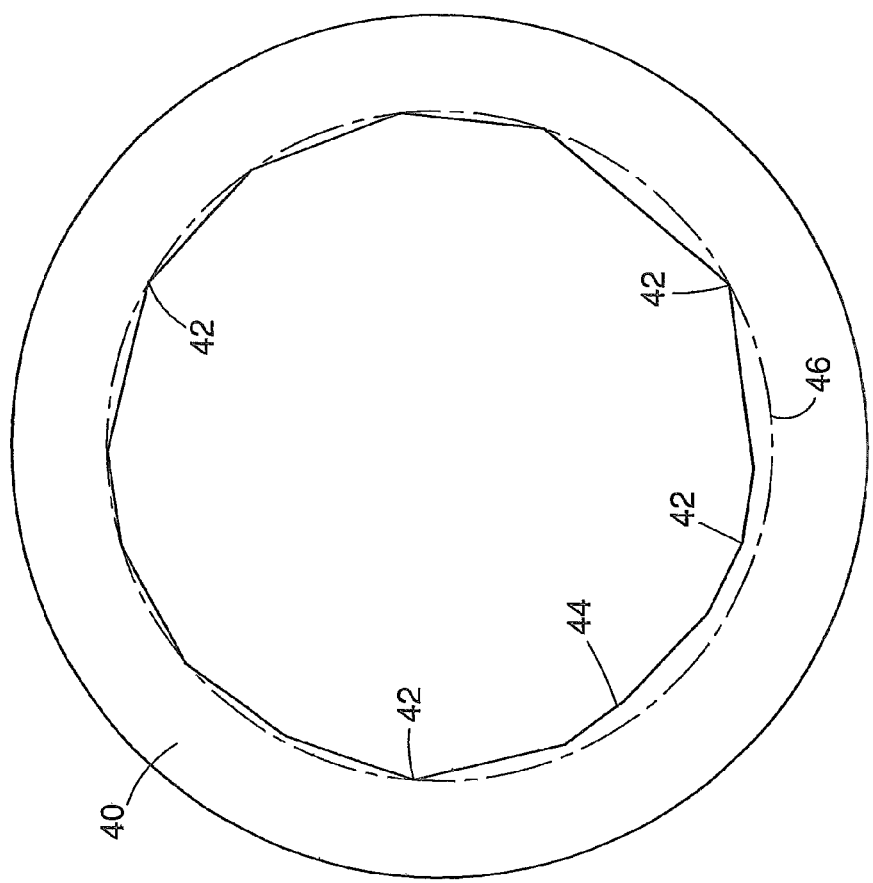
FIG. 6 is an end view of an embodiment of an upstream spider.
Figure 10:
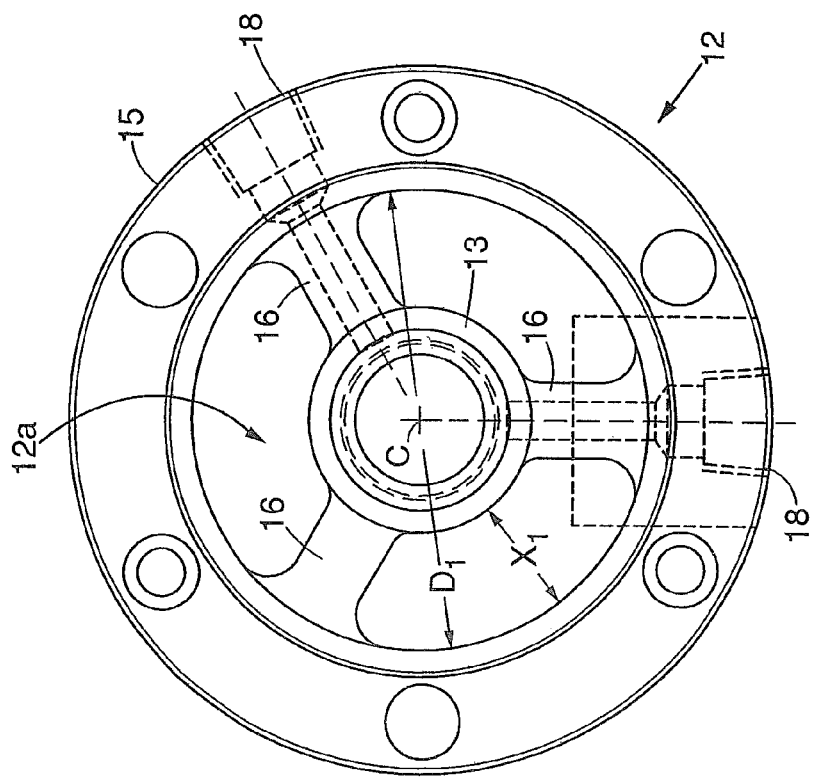
FIG. 10 is a schematic representation of spider lines on an extruded profile or pipe.
Figure 7:
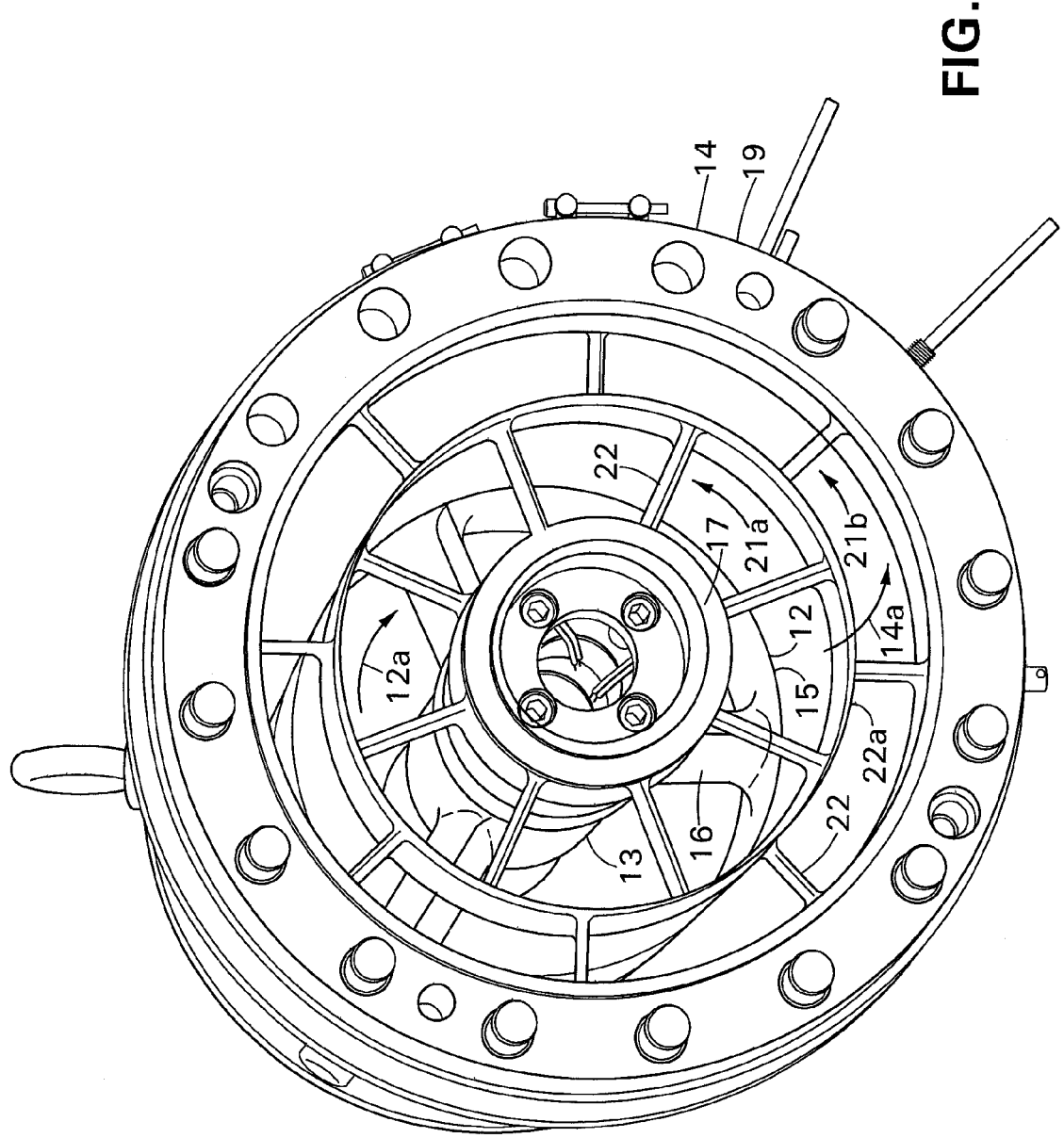
FIG. 7 is a downstream perspective view of a portion of the extrusion head of FIG. 1, showing the downstream spider and the upstream spider.
Figure 8:
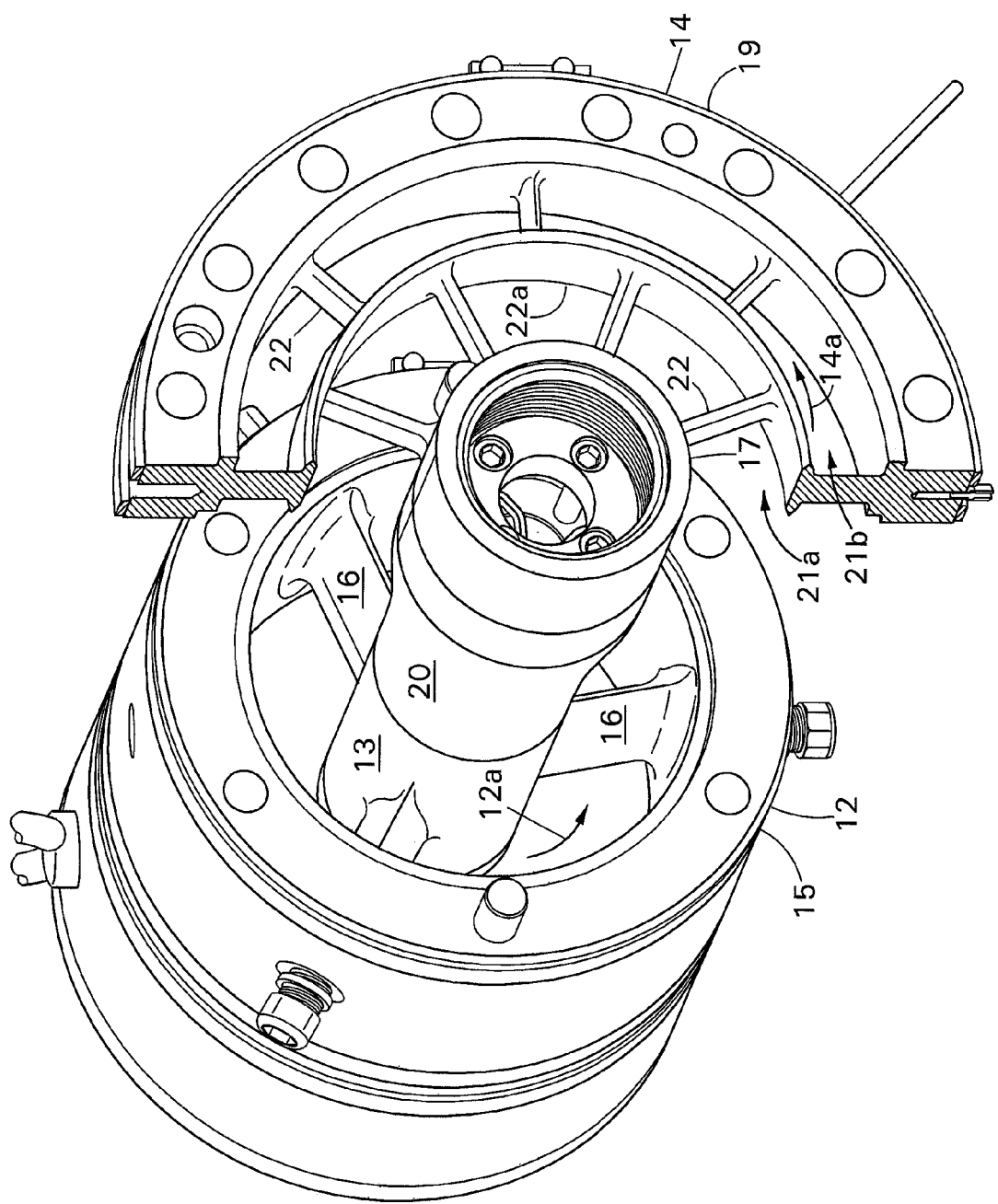
FIGS. 8 and 9 are partial sectional views of the portion of the extrusion head shown in FIG. 7.
Figure 9:
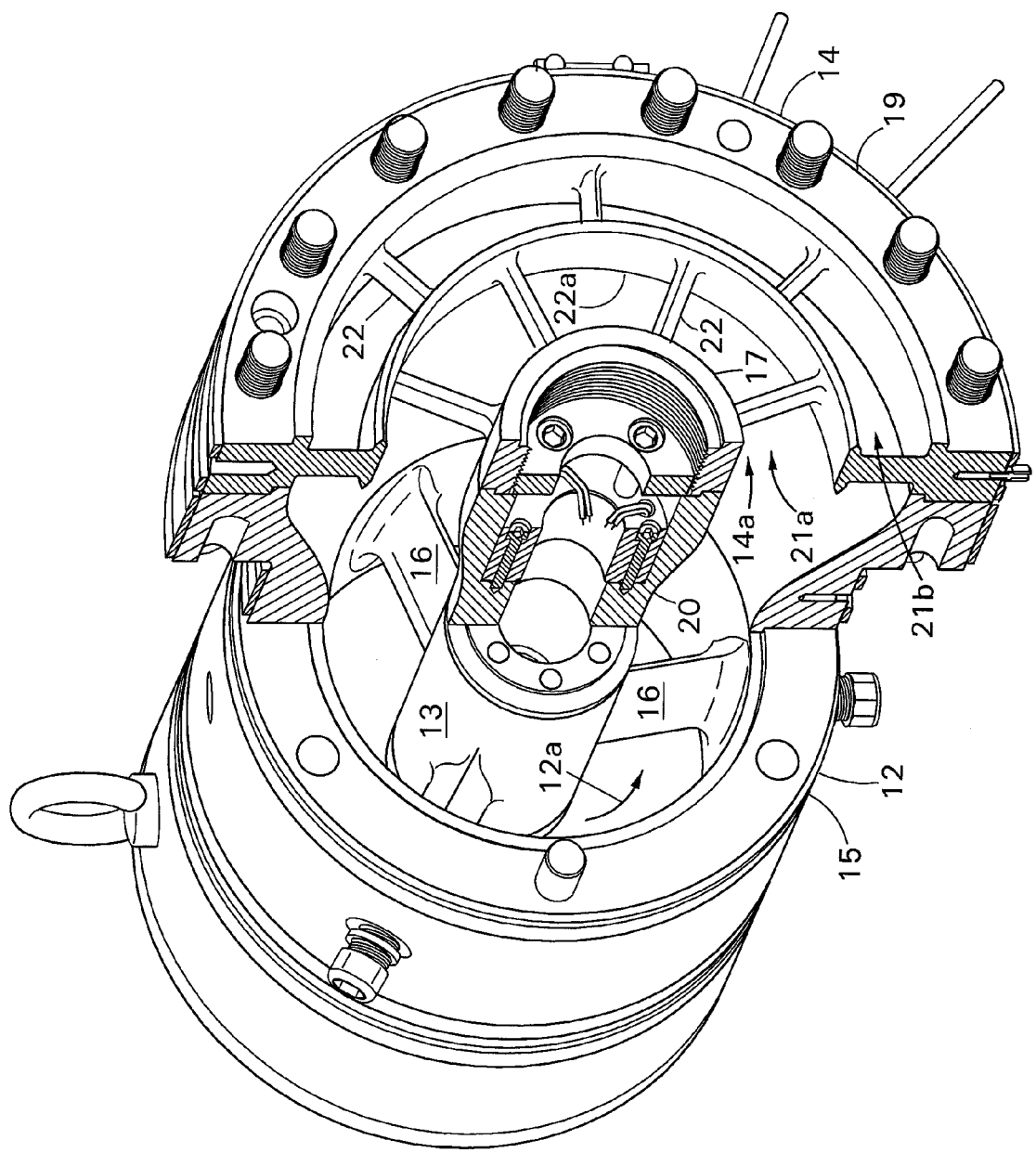

The upstream spider 12 can have robust, large or thick webs 16 which can have internal radial passages 18 for the insertion of electrical or control lines 18a (FIG. 6). The downstream spider 14 can lack internal passages in the webs 22 as shown, and therefore can have small or delicate thinner and axially shorter webs 22 that can result in reduced or smaller parting or spider lines 42 caused by webs 22 on the product 40, such as a pipe, extruded through the dies 26 (FIG. 10). The downstream spider 14 can have delicate webs 22 since the mandrel 20 is supported at two axial locations by two spiders 12 and 14, instead of a single robust spider. In addition, by supporting the mandrel 20 at two spaced apart locations, the mandrel 20 and inner die portion 26a can be more stable and is less likely to be moved out of position than a mandrel supported by a single spider, so that the wall thickness of an extruded profile 40 or pipe can be more consistent. Also, since the webs 22 of the downstream spider 14 can be delicate, thin or short, the downstream spider 14 can be positioned closer to the dies 26 than a spider having thicker webs such as a spider 12, while at the same time minimizing spider lines. Positioning the downstream spider 14 closer to the dies 26 can further stabilize the inner die portion 26a from lateral movement. In some embodiments, the downstream spider 14 can be positioned from the dies 26 a distance that is within one flow passage 14a diameter $D_2$ and can be within a half a diameter $D_2$. The upstream 12 and downstream 14 spiders can produce different flow characteristics or patterns in the molten polymer 24 flowing past each spider 12 and 14, which can promote mixing of the molten polymer 24 to reduce or remove parting or spider lines 42 in the extruded product 40. For example, the downstream spider 14 can produce a flow pattern that mixes the polymer 24 received from the upstream spider 12, which can reduce or remove spider lines 42 caused by the webs 16 of the upstream spider 12.

FIG. 10 shows a product or profile 40 such as a pipe having an inner surface 44 with spider lines, and a round theoretical inner surface 46 for comparison. With the downstream spider 14 promoting mixing of the molten polymer 24 received from the upstream spider 12, the spider lines 42 can be reduced to obtain an inner surface approaching or similar to the theoretical surface 46. In addition, the two spiders 12 and 14 can keep the position of the inner die portion 26a stable so that the inner and outer wall surfaces of the profile 40 can be concentric and therefore have a consistent wall thickness.

The webs 16 of the upstream spider 12 and the webs 22 of the downstream spider 14, or portions of the webs 16 and 22, can be axially, laterally, positionally, radially or angularly misaligned, or misorientated or offset, relative to each other in conduit 28 so that the webs 22 of the downstream spider 14 are not axially aligned or orientated with the webs 16 of the upstream spider 12. This can aid or promote mixing of the molten polymer 24, and can help reduce or remove parting or spider lines formed by the webs 16 of the upstream spider 12. As seen, in FIGS. 4-9, the webs 16 can be axially misaligned or misorientated from the webs 22 by being positioned at different angular locations around axis C. If the webs 16 and 22 were axially aligned in the same angular locations and orientations, the spider lines 42 formed by webs 16 would then be aligned with and engage webs 22, and could be increased or enhanced by webs 22.

In addition, the webs 22 can be sized, configured and shaped to further promote mixing of the molten polymer 24. For example, the downstream spider 14 can have an annular ring portion 22a, separating radially inner webs 22 from radially outer webs 22. The radially inner webs 22 and the radially outer webs 22 can be radially or angularly offset or misaligned from each other (different radial and angular locations around axis C) to further promote mixing differently at two radial or annular locations or regions, since flow separation around the webs 22 are locationally offset from each other at the two annular regions, a first or inner annular region 21a, and a second or outer annular region 21b.

In one embodiment, the upstream spider 12 can have a central hub 13 that is secured to the mandrel 20 upstream from the downstream spider 14 at an upstream location, and a cylindrical outer wall, ring or housing 15, between which the webs 16 extend and are connected or secured. The upstream spider 12 can have three webs 16 that are equally spaced apart by 120°, and can be thick enough to include passages 18. The webs 16 can angle rearwardly to minimize the formation of spider lines. The flow passage 12a can be generally annular in shape, flowing between the central hub 13 and the outer wall 15, and around the webs 16. Upstream spider 12 can be similar to that described in U.S. patent application Ser. No. 12/335,904, filed Dec. 16, 2008, and published on Jun. 25, 2009 as Publication No. US 2009-0160083-A1, the contents are incorporated herein by reference in their entirety. In other embodiments, the upstream spider 12 can have other suitable configurations, as known in the art.

The downstream spider 14 can have a central hub 17 that is secured to the mandrel 20 downstream from the upstream spider 12 at a downstream location, and a cylindrical outer wall, ring or housing 19 between which the webs 22 extend and are connected or secured. The annular ring portion 22a can be positioned between the hub 17 and the outer wall 19. The flow passage 14a can be generally annular in shape, flowing between the central hub 17 and the outer wall 19, and around the webs 22 and annular ring portion 22a. The annular ring portion 22a can in addition to the promoting mixing, can also provide rigidity to the delicate webs 22. The thickness of the webs 22 of the downstream spider 14 can be about 2 to 4 times thinner than the webs 16 of the upstream spider 12. In addition, the axial length $L_2$ of the webs 22 in the direction of the flow of polymer 24 can be shorter than the axial length $L_1$ of the webs 16 by at least 50% and can have a $L_2$ to $L_1$ ratio of about 1:4, 1:3 or 1:2, depending upon the embodiment. The thinner and shorter webs 22 can form smaller or less flow separation of the polymer 24 than webs 16, which minimizes the formation of new spider lines by the downstream spider 14. The axial length $L_3$ of the annular ring portion 22a can be about 50% longer than the axial length $L_2$ of the webs 22, where the $L_2$ to $L_3$ ratio can be about 1:1.5. In one embodiment, the downstream spider 14 can have inner 21a and outer 21b annular regions with the same number of webs 22. For example, eight webs 22 can be in the inner annular region 21a between the hub 17 and the annular ring portion 22a, and eight webs 22 can be in the outer annular region 21b between the annular ring portion 22a and the outer wall 19. The webs 22 can be equally spaced angularly away from each other, for example, by 45° in each annular region 21a and 21b, forming an offset of 22.5° between webs 22 in annular region 21a relative to webs 22 in annular region 21b. Positioning of the webs 22 offset in annular regions 21a and 21b can also form smaller radial outward sections of flow separation, since each web 22 only extends partway between the hub 17 and outer wall 19. Since the webs 22 of the downstream spider 14 have a different angular spacing than the webs 16 of the upstream spider 12, the webs 22 and 16 can be considered axially offset, misoriented or misaligned from each other. The increase in diameter $D_2$ of the downstream spider 14 can additionally position the webs 22 in the outer annular region 21b radially offset outwardly relative to the webs 16 of the upstream spider 12, and therefore axially offset. Axial misalignment of the webs 22 of the downstream spider 14 from the webs 16 of the upstream spider 12 can be in complete misalignment. In addition, axial misalignment can also include webs 22 that are in a different orientation or configuration from webs 16 where some portions may occupy or intersect the same axis in the direction of polymer flow, but are considered in axial misalignment because the webs 16 and 22 are generally not aligned or oriented relative to each other moving in the axial direction of the polymer flow.

The upstream spider 12 can have a flow passage 12a diameter of a diameter $D_1$ which is smaller than the flow passage 14a diameter $D_2$ of the downstream spider 14. As a result, the conduit 28 can expand in diameter and size moving from the upstream spider 12 to the downstream spider 14, which can also promote mixing of the polymer 24 by allowing the polymer 24 to flow into a larger volume region of the conduit 28 and expand. The difference in diameter $D_1$ and $D_2$ can be greater than 30%, such as ratios of about 1:1.45 or about 1:1.5. In other embodiments, the difference in diameter can vary, or the diameters can be the same. In addition, although the mandrel 20 can increase in diameter moving towards the downstream spider, the size of the annular gap $X_2$ between the hub 17 and the outer wall 19 of the downstream spider 14 can still be larger than the size of the annular gap $X_1$ between the hub 13 and the outer wall 15 of the upstream spider 12. The difference in gap size between $X_1$ and $X_2$ can in some embodiments, be at least about 30%, such as ratios of about 1:1.5 or about 1:1.6. As a result, the flow passage 14a in the downstream spider 14 can have a much larger area than the flow passage 12a in the upstream spider 12 to promote mixing. The conduit 28 can have a section that narrows before reaching the dies 26, and the mandrel 20 can expand in size toward the dies 26.

Figure 11:
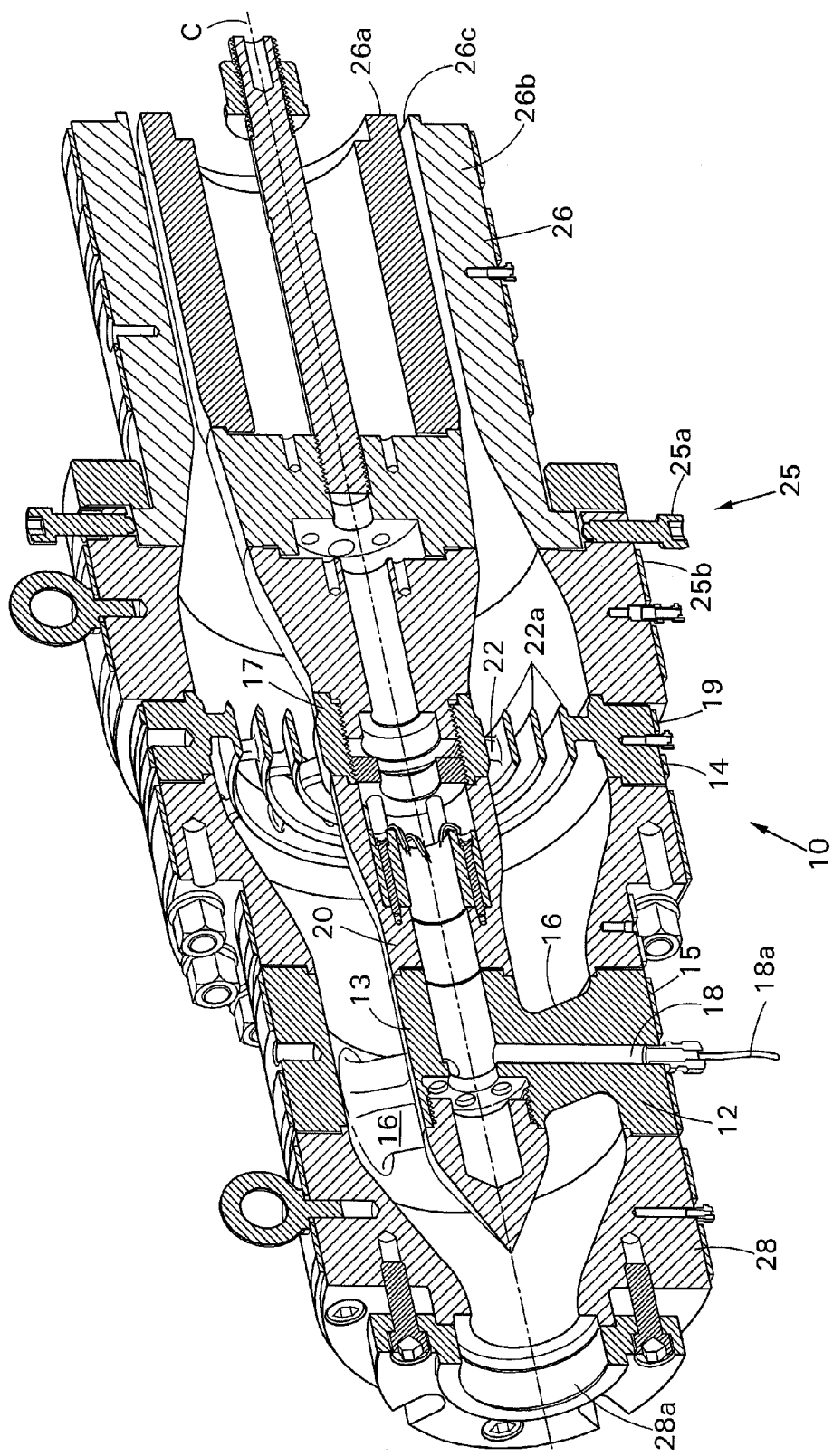
FIGS. 11 and 12 are sectional views of an embodiment of an extrusion head having a downstream spider with another web configuration.
Figure 12:
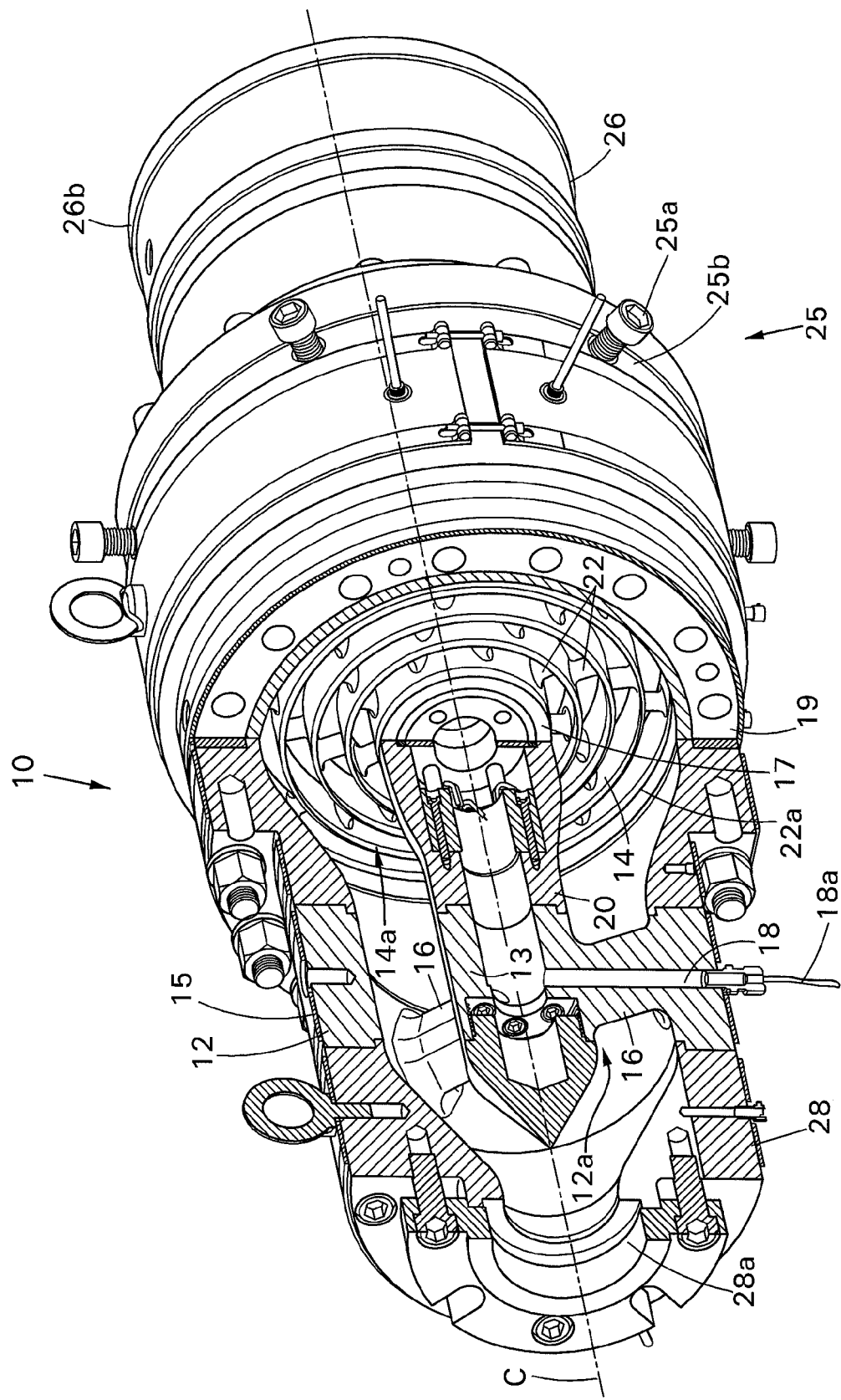

FIGS. 11 and 12 depict another embodiment in which the downstream spider 14 can differ from the embodiment shown in FIGS. 1-9 by having multiple concentric annular ring portions 22a, for example three, between which webs 22 extend that can be radially or angularly offset from each other (different radial and angular locations), and can be also axially misaligned from the webs 16 of the upstream spider 12. The three annular ring portions 22a can form four annular regions between the hub 17 and outer wall 19, with webs 22 spaced apart form each other in an offset manner. Each annular region can have the same amount of webs 22, or radially outward annular regions can have more if desired. Consequently, the flow separation and mixing of polymer 24 can be locationally different in adjacent annular regions. In addition, the flow separation length in the radial outward direction of each web 22 can be kept short. This configuration can be made to have or create greater flow resistance and pressure than the embodiment of FIGS. 1-9.

Figure 13:
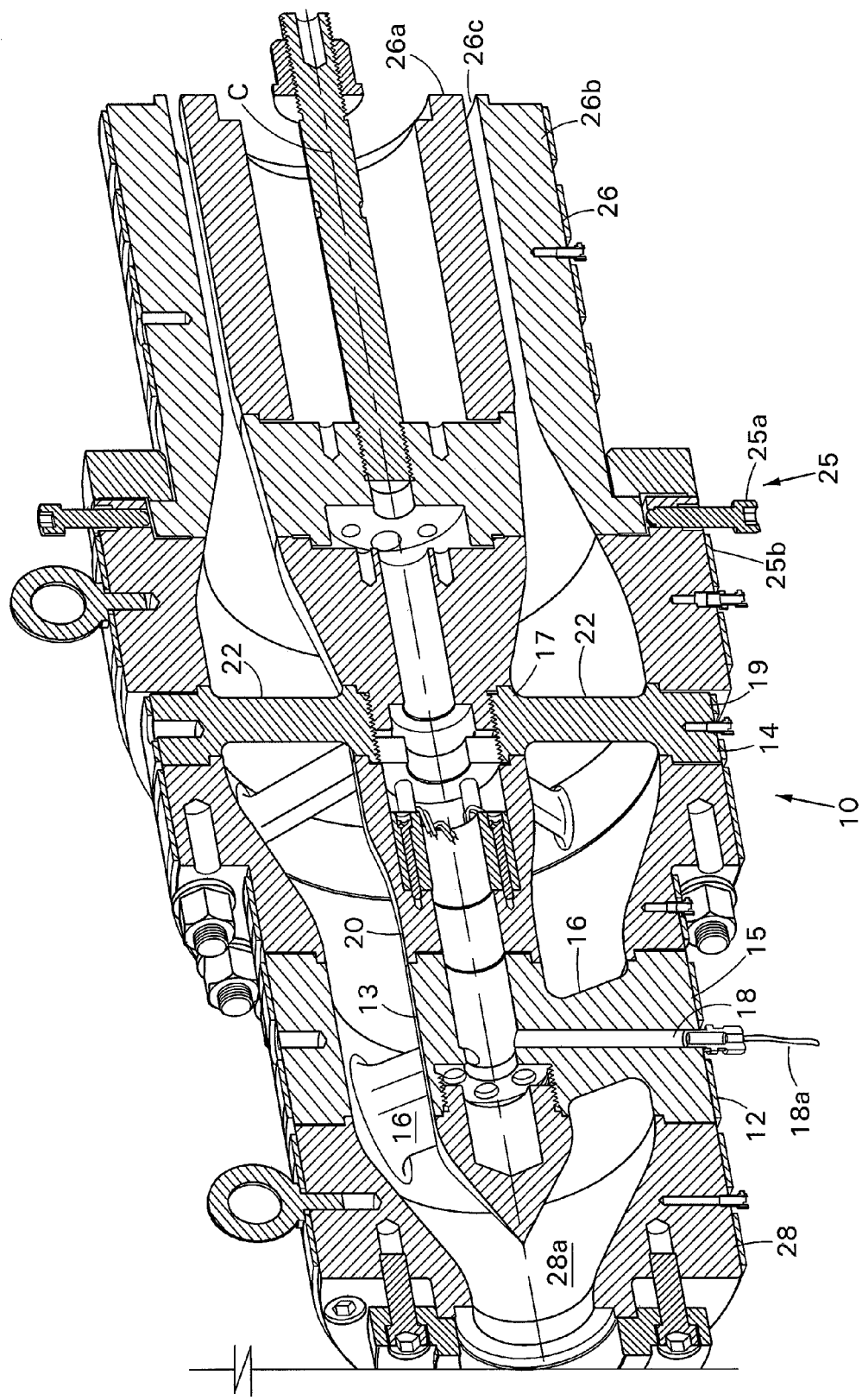
FIGS. 13 and 14 are sectional views of an embodiment of an extrusion head having a downstream spider with still another web configuration.
Figure 14:
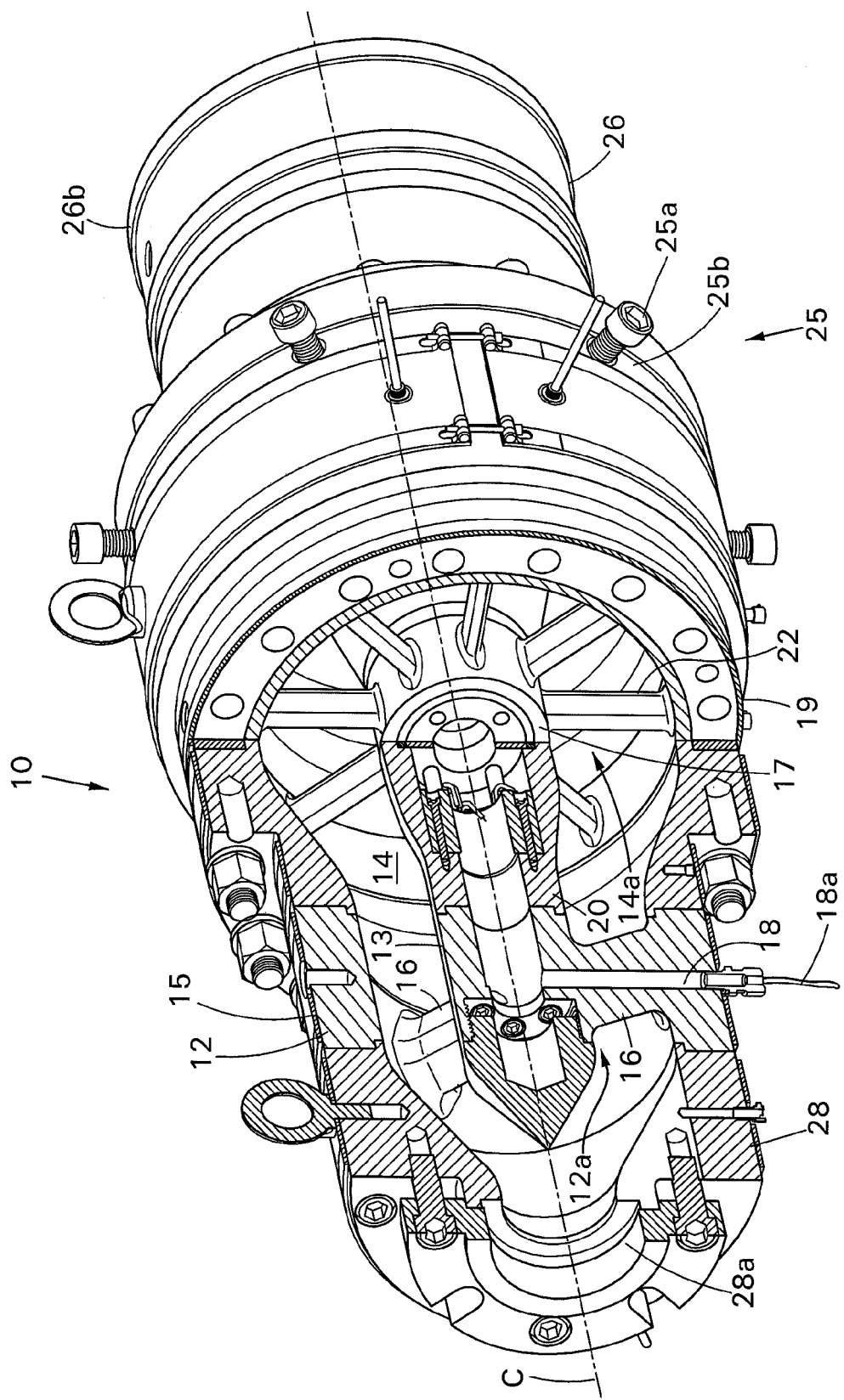

FIGS. 13 and 14 depict an embodiment having webs 22 which can be radially angularly misaligned, misorientated or offset from the webs 16 of the upstream spider 12 (different angular locations), and differs from the embodiment shown in FIGS. 1-9 in that the downstream spider 14 does not have annular ring portions 22a. For example, eight equally spaced webs 22 can be extended between the hub 17 and the outer wall 19. The webs 22 can be made to be thicker and axially longer than those in FIGS. 3-5 if desired, such as for strength. This configuration can be made to have less flow resistance and pressure than the embodiments of FIGS. 1-9, or 11 and 12.

Figure 15:
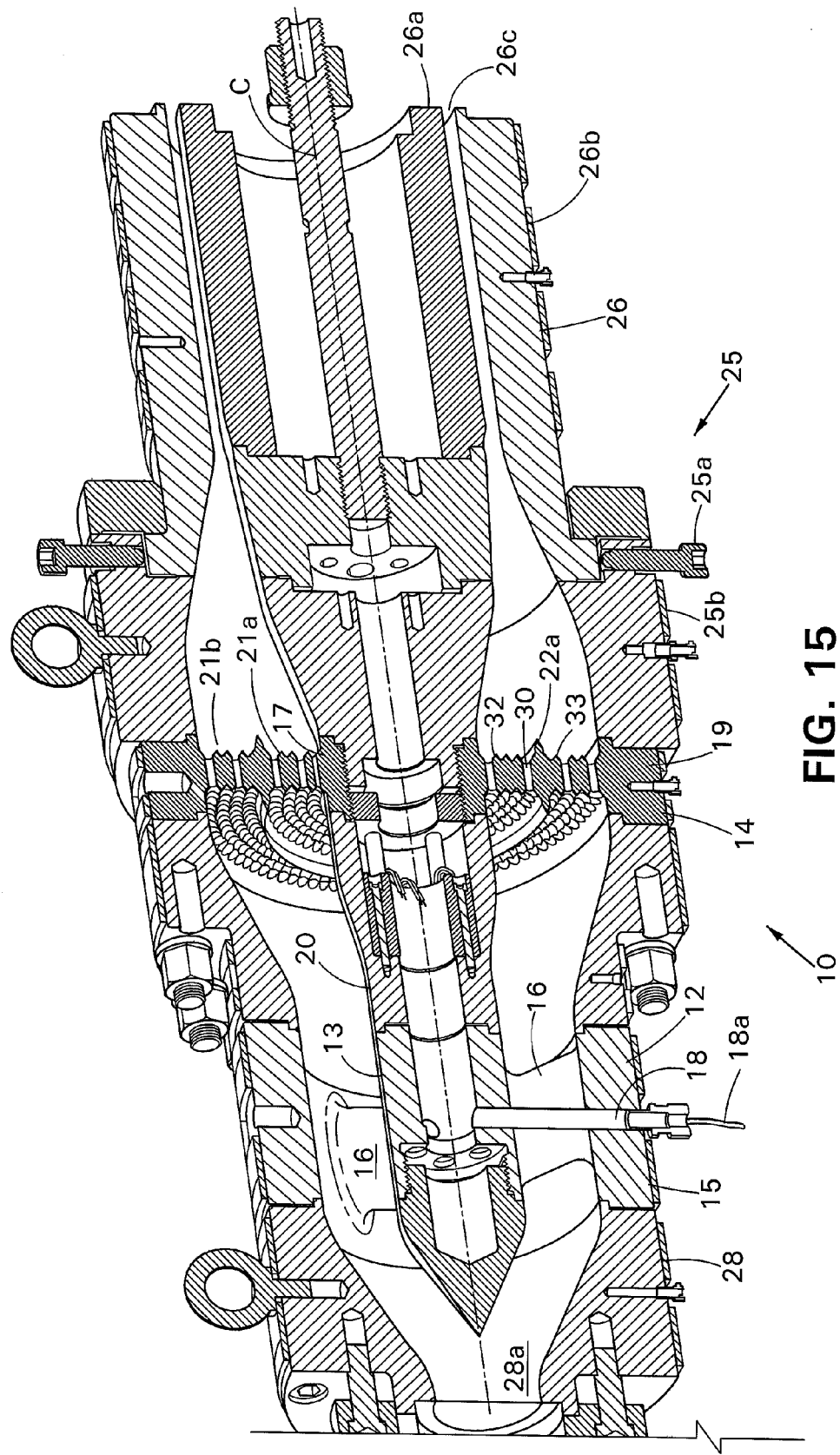
FIGS. 15 and 16 are sectional views of an embodiment of an extrusion head having a downstream spider with yet another web configuration.
Figure 16:
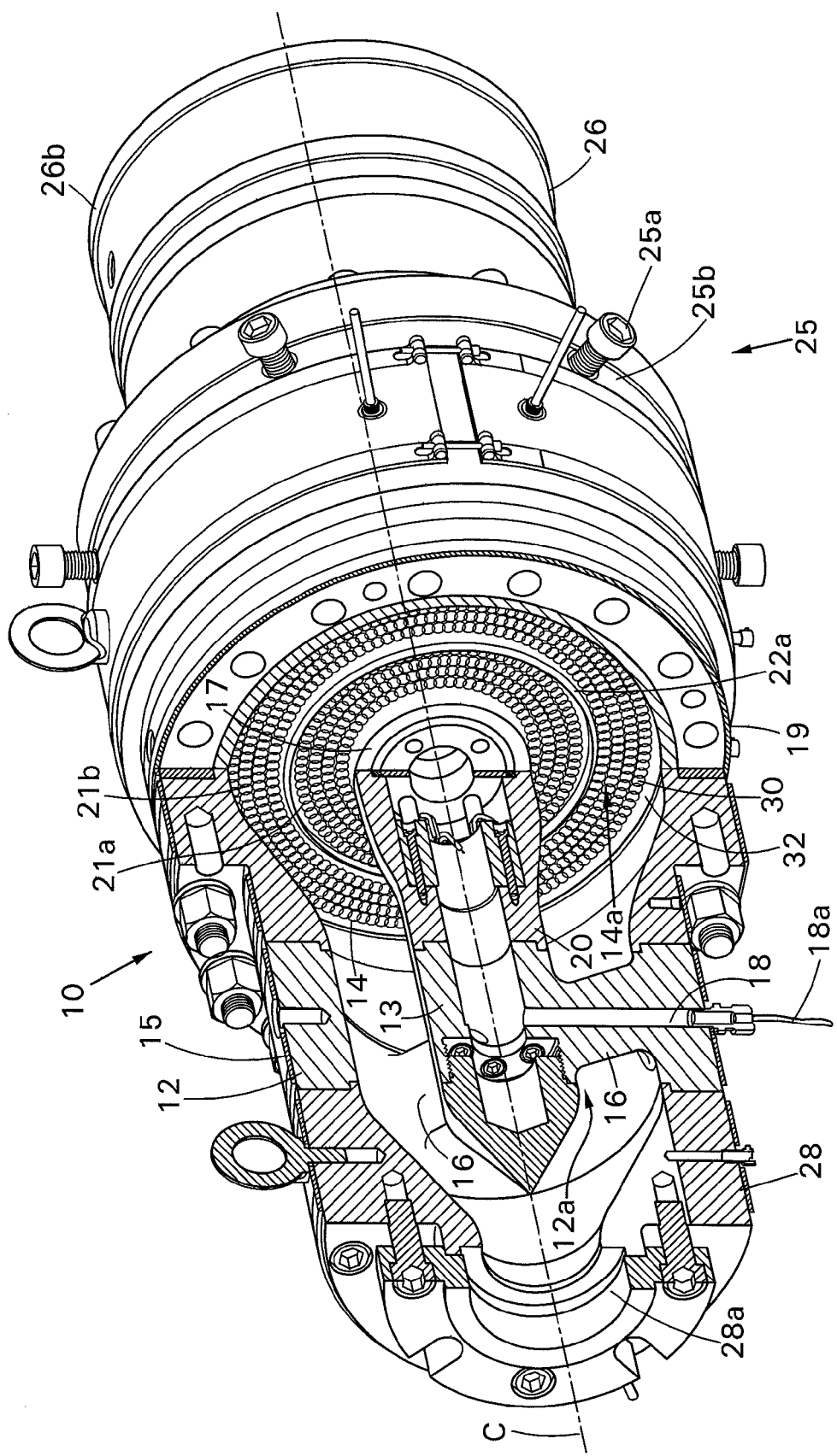

FIGS. 15 and 16 depict an embodiment where the downstream spider 14 has a series of holes 30 formed in a circular plate or web 32, such as in a breaker plate configuration. The series of holes 30 can be in a series of concentric ring patterns, for example, 8 rings, and an annular ring portion 22a can be located at an intermediate radial position, forming annular regions 21a and 21b. This configuration can produce a flow pattern that is different from that provided by the upstream spider 12, by having multiple passages formed by the holes 30, thereby promoting mixing. The web 32 forms web portions 33 that are radially or angularly offset relative to web portions of webs 16 of the upstream spider 12 since most of the web portions 33 between each hole 30 are in offset locations. Although some portions of the web portions 33 could occupy or intersect the same axis in the direction of polymer flow as a web 16, the web 32 and web portions 33 are considered in axial misalignment or misorientation because the web portions 33 do not have the same shape, configuration and orientation as the webs 16 for alignment with each other.

This configuration can be made to have greater flow resistance and pressure than the previous embodiments.

The various embodiments of the downstream spiders 14 shown can each have different flow characteristics or patterns from the upstream spider 16, which can promote mixing of the molten polymer 24 before reaching the dies 26. In addition, the flow characteristics of each embodiment of the downstream spiders 14 can differ. As seen, the downstream spiders 14 can have a variety of different configurations to promote mixing of the molten polymer 24 after passing by the upstream spider 12, and while also supporting the mandrel 20. The misalignments, misorientations or offsets of web portions of the webs 16 of the upstream spider 12 from web portions of webs 22 and 32 of a downstream spider 14, can include angular, radial, lateral, axial, positional, configurational, or linear offsets or misalignments or misorientations. The downstream spiders 14 can also include various different structures at different radial locations, as seen in the figures, which can promote mixing. Particular downstream spiders 14 can be removed and replaced from among a group, collection or set of downstream spiders 14 having different configurations, to cause particular selected mixing, pressure and flow effects or characteristics, which can be desired, such as lamination and internal wall heating caused by friction, depending upon the die configuration and the extruded product. Changing the downstream spider 14 can result in changes of the appearance and properties of the extruded product.

While this invention has been particularly shown and described with references to example embodiments thereof, it will be understood by those skilled in the art that various changes in form and details may be made therein without departing from the scope of the invention encompassed by the appended claims. For example, various features in the embodiments shown can be omitted or combined.

What is claimed is:

1. An extrusion head comprising:
   a conduit;
   a central mandrel extending within the conduit for supporting an inner die portion of a set of dies that has inner and outer die portions;
   an upstream spider and a downstream spider, each having webs supporting the central mandrel at axially spaced apart positions, the webs of the upstream and downstream spiders having web portions that are axially offset from each other to promote mixing of polymer flowing through the conduit, the downstream spider having radially inner web portions and radially outer web portions which are separated from each other by an annular ring portion, the radially inner web portions being angularly spaced from the radially outer web portions in an offset manner to promote flow separation and mixing that is locationally angularly different in adjacent annular regions, at least a part of said web portions of the downstream spider extending radially outwardly relative to the webs of the upstream spider to be radially outwardly offset thereof.

2. The extrusion head of claim 1 in which the downstream spider has thinner webs than the upstream spider.

3. The extrusion head of claim 2 in which the upstream spider has internal passages extending through the webs for electrical lines.

4. The extrusion head of claim 1 in which the webs of the upstream and downstream spiders are axially offset from each other.

5. The extrusion head of claim 1 in which the downstream spider is selected from a group of downstream spiders, each having a different configuration, for changing flow and pressure of polymer entering the set of dies.

6. The extrusion head of claim 1 in which the webs of the downstream spider have a shorter length in the direction of polymer flow than the webs of the upstream spider.

7. The extrusion head of claim 1 in which the conduit has a larger diameter at the downstream spider than at the upstream spider.

8. The extrusion head of claim 7 in which the downstream spider has a larger diameter flow passage than the upstream spider.

9. The extrusion head of claim 1 in which the mixing of the polymer flowing through the conduit reduces spider lines in an extruded product that is extruded through the set of dies.

10. An extrusion head comprising:
    a conduit;
    a central mandrel extending within the conduit for supporting an inner die portion of a set of dies that has inner and outer die portions;
    an upstream spider and a downstream spider, each having webs supporting the central mandrel at axially spaced apart positions, the webs of the upstream and downstream spiders having web portions that are axially offset from each other to promote mixing of polymer flowing through the conduit for reducing spider lines in an extruded product that is extruded through the set of dies, the webs of the downstream spider being thinner and shorter in length in the direction of polymer flow than the webs of the upstream spider, the downstream spider having radially inner web portions and radially outer web portions which are separated from each other by an annular ring portion, the radially inner web portions being angularly spaced from the radially outer web portions in an offset manner to promote flow separation and mixing that is locationally angularly different in adjacent annular regions, at least a part of said web portions of the downstream spider extending radially outwardly relative to the webs of the upstream spider to be radially outwardly offset thereof.

* * * * *